US008909566B2

(12) United States Patent
Moyle et al.

(10) Patent No.: US 8,909,566 B2
(45) Date of Patent: Dec. 9, 2014

(54) METHOD, A COMPUTER PROGRAM AND APPARATUS FOR ANALYZING SYMBOLS IN A COMPUTER

(75) Inventors: Stephen Anthony Moyle, Oxfordshire (GB); Graham Kenneth Thwaites, Oxfordshire (GB)

(73) Assignee: Oracle International Corporation, Redwood Shores, CA (US)

( * ) Notice: Subject to any disclaimer, the term of this patent is extended or adjusted under 35 U.S.C. 154(b) by 374 days.

(21) Appl. No.: 13/377,803

(22) PCT Filed: May 18, 2010

(86) PCT No.: PCT/GB2010/050812
§ 371 (c)(1),
(2), (4) Date: Dec. 12, 2011

(87) PCT Pub. No.: WO2010/149986
PCT Pub. Date: Dec. 29, 2010

(65) Prior Publication Data
US 2012/0136652 A1    May 31, 2012

Related U.S. Application Data

(60) Provisional application No. 61/219,520, filed on Jun. 23, 2009.

(51) Int. Cl.
*G06F 15/18* (2006.01)
*G06F 21/55* (2013.01)
*G06F 9/45* (2006.01)

(52) U.S. Cl.
CPC .............. *G06F 21/552* (2013.01); *G06F 8/425* (2013.01)
USPC .......................................................... 706/12

(58) Field of Classification Search
CPC . H04L 63/1441; H04L 63/20; H04L 63/1425; H04L 63/1416; H04L 63/14; H04L 63/1408; H04L 63/1433; G06F 21/00
See application file for complete search history.

(56) References Cited

U.S. PATENT DOCUMENTS 3,333,248 A * 7/1967 Greenberg et al. ............ 382/159
4,499,596 A * 2/1985 Casey et al. .................... 382/159
4,742,458 A * 5/1988 Nathans et al. ................ 382/207

(Continued)

OTHER PUBLICATIONS

Orso et al., "Preventing SQL Code Injection by Combining Static and Runtime Analysis", May 2008, pp. 1-68.*

*Primary Examiner* — Jeffrey A Gaffin
*Assistant Examiner* — Paulinho E Smith
(74) *Attorney, Agent, or Firm* — Kilpatrick Townsend & Stockton LLP (57) ABSTRACT

The invention provides a computer-implemented method of analyzing symbols in a computer system, the symbols conforming to a specification for the symbols, in which the specification has been codified into a set of computer-readable rules; and, the symbols analyzed using the computer-readable rules to obtain patterns of the symbols by determining the path that is taken by the symbols through the rules that successfully terminates, and grouping the symbols according to said paths, the method comprising; upon receipt of a message at a computer, performing a lexical analysis of the message; and, in dependence on lexical analysis of the message assigning the message to one of the groups identified according to said paths. The invention also provides a computer programmed to perform the method and a computer program comprising program instructions for causing a computer to perform the method.

23 Claims, 5 Drawing Sheets

(56) References Cited

U.S. PATENT DOCUMENTS

| | | | |
|---|---|---|---|
| 7,110,540 B2* | 9/2006 | Rajagopal et al. | 380/44 |
| 7,735,118 B2* | 6/2010 | Brok et al. | 726/4 |
| 7,844,873 B2* | 11/2010 | Funatsu | 714/741 |
| 8,392,590 B2* | 3/2013 | Bouchard et al. | 709/230 |
| 8,432,914 B2* | 4/2013 | Zinjuwadia et al. | 370/392 |
| 2003/0145203 A1* | 7/2003 | Audebert et al. | 713/169 |
| 2004/0031024 A1* | 2/2004 | Fairweather | 717/143 |
| 2005/0094636 A1* | 5/2005 | Lee et al. | 370/389 |
| 2005/0137969 A1* | 6/2005 | Shah | 705/39 |
| 2005/0190980 A1* | 9/2005 | Bright | 382/240 |
| 2006/0236093 A1* | 10/2006 | Brok et al. | 713/151 |
| 2006/0288047 A1* | 12/2006 | Chron et al. | 707/200 |
| 2007/0185703 A1* | 8/2007 | Moyle | 704/9 |
| 2008/0034315 A1* | 2/2008 | Langoulant et al. | 715/780 |
| 2008/0189673 A1* | 8/2008 | Ying | 716/21 |
| 2008/0228467 A1* | 9/2008 | Womack et al. | 704/9 |
| 2008/0240566 A1* | 10/2008 | Thint | 382/181 |
| 2008/0243741 A1* | 10/2008 | Visel et al. | 706/41 |
| 2009/0024366 A1* | 1/2009 | Atkinson et al. | 703/2 |
| 2009/0040020 A1* | 2/2009 | Moyle et al. | 340/5.74 |
| 2009/0044256 A1* | 2/2009 | Moyle et al. | 726/4 |
| 2009/0055166 A1* | 2/2009 | Moyle | 704/9 |
| 2011/0131034 A1* | 6/2011 | Moyle et al. | 704/9 |
| 2012/0109639 A1* | 5/2012 | Moyle | 704/9 |
| 2012/0136652 A1* | 5/2012 | Moyle et al. | 704/9 |
| 2013/0325826 A1* | 12/2013 | Agarwal et al. | 707/703 |
| 2013/0325829 A1* | 12/2013 | Agarwal et al. | 707/703 |

* cited by examiner

| Message Classification | Message |
|---|---|
| 13428614 | select max(Sno), min(Sno) from tbl_Syslog |
| 440536710 | select 100 |
| 376125926 | SELECT t3.Sno, t3.MasterIP, t3.MasterPort, t3.SlaveIP, t3.SlavePort, t3.Mode, t3.Enable, t3.Status, t3.Remark, t3.FilterSeverity, t3.FilterString, t3.ForwardNoForNMS, t3.DeleteNoForNMS, t3.ForwardNoForNE, t3.DeleteNoForNE, t3.AlarmState FROM tbl_SyslogServer t3 |
| 440536710 | select 100 |
| 341757382 | update TELog set FirstRecordID=15310000, LastRecordID=15401999, CurrentLogSize=91900 where LogID= 4 |
| 341757382 | update TELog set FirstRecordID=15310000, LastRecordID=15402099, CurrentLogSize=92000 where LogID= 4 |
| 286739302 | SELECT COUNT (*) FROM tbl_Log t29 |

| Input message | Selective Message Token sequence |
|---|---|
| 'SELECT COUNT (*) FROM tbl_Log t29' | [identifier("select"), identifier("count"), self("("), operator("*"), self(")"), identifier("from"), identifier("tbl_log"), identifier("t29")] |
| 'update TELog set FirstRecordID=15310000 , LastRecordID=15401999 , CurrentLogSize=91900 where LogID= 4' | [identifier("update"), identifier("telog"), identifier("set"), identifier("firstrecordid"), operator("="), decimal("15310000"), self(","), identifier("lastrecordid"), operator("="), decimal("15401999"), self(","), identifier("currentlogsize"), operator("="), decimal("91900"), identifier("where"), identifier("logid"), operator("="), decimal("4")] |
| 'update TELog set FirstRecordID=15310000 , LastRecordID=15402099 , CurrentLogSize=92000 where LogID= 4' | [identifier("update"), identifier("telog"), identifier("set"), identifier("firstrecordid"), operator("="), decimal("15310000"), self(","), identifier("lastrecordid"), operator("="), decimal("15402099"), self(","), identifier("currentlogsize"), operator("="), decimal("92000"), identifier("where"), identifier("logid"), operator("="), decimal("4")] |

METHOD, A COMPUTER PROGRAM AND APPARATUS FOR ANALYZING SYMBOLS IN A COMPUTER

RELATED APPLICATIONS

This application a U.S. National Stage Application of PCT/GB2010/050812 filed on May 18, 2010, that claims priority to U.S. provisional patent application No. 61/219,520 filed on Jun. 23, 2009, the contents which is hereby incorporated by reference.

BACKGROUND OF THE INVENTION

The present invention relates to a method, a computer program and apparatus for analyzing symbols in a computer.

There are many examples of computer systems in which it is useful to be able to analyze symbols passing through or stored in the computer system. As will be appreciated from the following, the term "symbols" in this context is to be construed broadly. In general, the term "symbols" is used herein in the broad sense, for example, including computer messages, which term is also to be construed broadly and includes for example computer messages in a computer language (including computer instructions, such as executable programs), natural languages in computer-readable form (such as in documents, emails, etc.). "Symbols" also includes computer data in the conventional sense, i.e., typically, abstractions of real world artifacts, etc.

In one example of computer systems in which it is useful to be able to analyze symbols passing through or stored in the computer system, third parties can attempt to take control of a computer by "attacking" the computer system. Such "attacks" can be carried out by exploiting the well-known buffer overflow vulnerabilities of some computer systems. In another example, hacking can take place by the third party sending commands to the computer system in which the commands are correctly structured in the context of the language of the computer system, but which are intended to cause the computer system to perform undesirable actions including to return an error message that can be used by the third party for reconnaissance or to return inappropriate information to a third party or to gain illegal access to the computer system. Attacks of this type on SQL databases are well known and yet are difficult to defend against. SQL databases are widely used, and are used for example by e-commerce and many other websites to hold user data (such as login name and password, address and credit card details, etc.).

In another example, it may be desirable to monitor computer symbols or messages to ensure that the computer system is being used properly and that for example it is not being used inappropriately. For example, in an organization, a user may be using a computer system inappropriately, for example by using the system for purposes for which the user is not authorised, and yet which is not intended by the user to be an "attack" on the computer system as such.

In our co-pending US and European patent applications entitled "A method, A Computer Program and Apparatus for Analyzing Symbols in a Computer" having application numbers U.S. Ser. No. 11/672,253 and EP-A-1,830,253, respectively, there is described and disclosed a method for analyzing symbols in a computer system. The method and apparatus, referred to herein as "Efficient Grammatical Clustering" ("EGC"), described in the aforementioned patent applications, provides a means to understand usage patterns based on messages entering (or leaving) computer systems. For example, EGC provides a means of being able to recognise messages that are the different database commands entering a relational database system. This enables a baseline of normal behavior to be determined. EGC enables all new messages, i.e. messages that have not been seen by the system previously, to be recognised so that a proactive device can determine whether a new message (command) should be allowed to pass to the database or not.

The EGC patent applications, the entire contents of which are hereby incorporated by reference, relate to a method by which a unique execution path of any instrumented computer program can be determined. Such an execution path provides the basis for generalization of execution paths into semantically similar clusters. Each execution path can be assigned a unique cluster identifier.

In one embodiment of the EGC patent applications, grammatical clustering of messages which are sentences within a computer language is performed. In this case, the computer program is a parser and the execution path is generated by the operation of the parser on some input sentence messages (in the appropriate computer language). In the EGC method, parsing of the incoming messages is thus extremely important as it is the parsing of the messages that enables the respective execution paths to be determined from which the unique cluster identifier can be assigned to the message.

Figure 1:
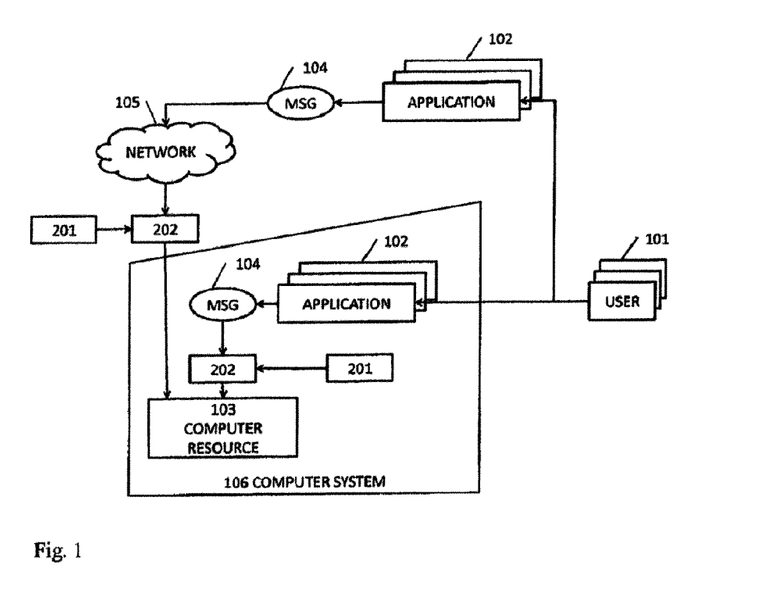
FIG. 1 shows a schematic representation of an example of a networked computer system arranged and configured to perform Efficient Grammatical Clustering.
Figure 2:
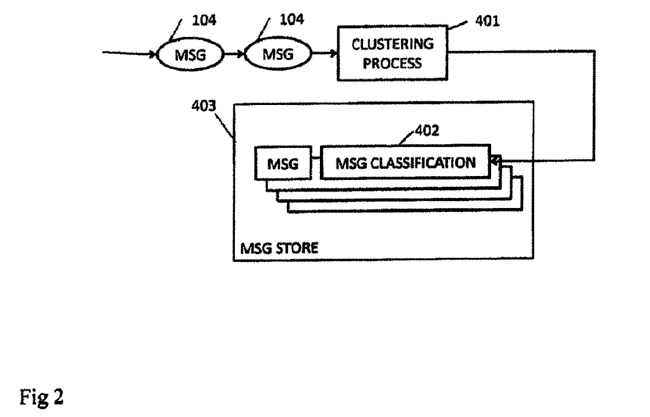
FIG. 2 shows a schematic representation of some steps of Efficient Grammatical Clustering as might be used in the computer system of FIG. 1.

Referring to FIGS. 1 and 2, the EGC method is briefly described. There is shown in FIG. 1 an example of a computer system 106 connected to a network 105.

The computer system 106 has a computer resource 103 which might be, for example, an SQL database. The computer system 106 makes its computer resource 103 available to applications 102 interacting directly or across the computer network 105 to support one or more users 101. The interaction with the computer resource 103 is mediated through a computer language via the transmission of Messages MSG 104 within the message language. A process 202 is provided operating within or on the computer system 106 to observe messages. The message and the intent of the message can be determined via another process 201 explained below.

Typically, the messages MSG 104 might be used to specify the desired operational behavior of components in the computer system 106. Thus, messages are used between components within the computer system, and messages are used by users to gain access to the computer system 106. Computer languages are used to facilitate the use of messages in the computer system. Each computer language is defined by a grammar so that messages conform to a known syntax. The grammar of such languages is published so that software developers can ensure that the messages of the software conform to the correct syntax.

The grammar of the computer language of the messages that are to be analyzed is defined, e.g. using first order logic. This may be carried out in a manner that is known per se. For example, the programming language Prolog can be used to describe the grammar of the language as a set of first order logic. This logic is then applied initially to a set of training examples of messages. Such messages are defined so as to be correct syntactically in the context of the language and appropriate in the sense that they are messages that are deemed to be acceptable in the context of usage of the system around which the messages pass. The logic contains clauses. When the logic is applied to the messages, the identity of the clauses along a successful path through the logic is noted.

In this way, paths of acceptable messages being parsed via the logic are obtained. These paths can then be grouped according to similarity. In turn, the messages that follow the respective paths can be grouped according to similarity in this sense, so that patterns of similar messages can be discerned.

This means that new messages, which are different from messages used in the training, can then be allocated to patterns of messages that are known to be acceptable, or rejected.

The EGC method works by analyzing symbols into patterns, so that new symbols can be analyzed more efficiently than in other known techniques. This enables the EGC methodology to be implemented in real-time with relatively little computational overhead. In one example, the method is carried out on new symbols to determine whether the new symbols fit a pattern of data that is known or constitute a new pattern. Patterns may also be referred to as "clusters" as they represent a cluster of similar paths through the computer logic. In practice, if the new symbols fit a pattern that is known, then a decision will already have been made as to whether symbols fitting that known pattern are to be deemed acceptable or not. If the symbols constitute a new pattern, in practice a decision will have been made what to do with symbols that constitute a new pattern, such as "always deem not acceptable" or "send error report", etc.

The EGC system and method is not concerned with generating new rules for new messages. Instead, it is concerned with determining patterns for computer messages. In one embodiment, the patterns that are obtained can then be considered, for example "manually" by a human user, to determine whether a computer system has been compromised.

Referring to FIG. 2, there is shown a simplified schematic flow chart for the process 201 by which messages are classified or clustered, using the EGC method, in dependence on semantic intent of the messages. Messages MSG 104 received by a computer are clustered using the EGC process 401 which produces a classification MSG CLASSIFICATION 402 of the message. The message classifications are stored, along with a copy of the respective messages, in a message store MSG STORE 403. As well as the message, other attributes about the message can be included in the message store. For example, these attributes could include, amongst others; the date & time the message was received; the username or application name that sent the message; network addressing information about the source and destination of the message; etc.

The EGC system works well. In particular, by analyzing the symbols into patterns, new symbols can be analyzed more efficiently than in previous known techniques, which makes it possible to implement the method in real-time with relatively little computational overhead. However, although the EGC system does work well, a full parse of each message is needed, which can be computationally intensive. Indeed, the process typically involves
1) lexical analysis of a received message, in which the message is tokenised;
2) parsing of the tokenised message through a grammar, e.g. an instrumented grammar;
3) extracting the summarised execution path and finally;
4) mapping the extracted summarised execution path to a unique cluster identifier.

With reference to FIG. 2, for each message MSG 104, the Clustering Process 401 provides a unique classification MSG CLASSIFICATION 402 of the semantic intent of the message. This uniqueness allows syntactically different messages to be classified in the same way because their class of semantic intent is identical.

Figure 3:
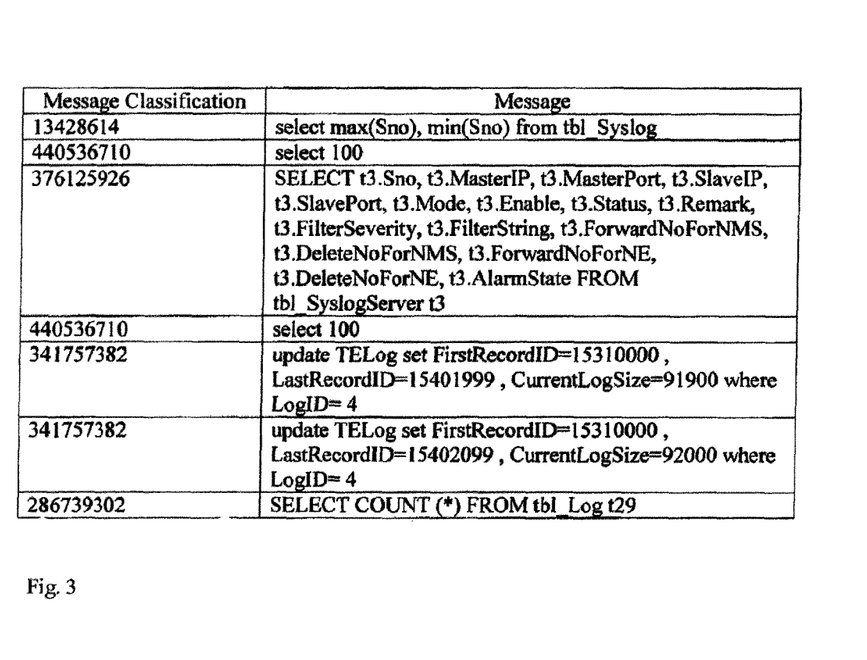
FIG. 3 shows a table of an example of messages that might be used in classification using Efficient Grammatical Clustering.

In the context of a computer resource that is a relational database, the messages are received at the computer resource in the language of Structured Query Language (SQL). As examples, the unique message classification 402 for 7 specific messages is shown in FIG. 3. Performing a full parse of each message MSG 104 through the instrumented grammar so as to determine the semantic intent of the message can be extremely computationally intensive. Therefore, as data rates and volumes of processed traffic and data increase, a method to reduce the computational intensity whilst still providing the required or desired performance levels and accurate determining of semantic intent is sought.

According to a first aspect of the present invention, there is provided a computer-implemented method of analyzing symbols in a computer system, the symbols conforming to a specification for the symbols, in which the specification has been codified into a set of computer-readable rules; and, the symbols analyzed using the computer-readable rules to obtains patterns of the symbols by determining the path that is taken by the symbols through the rules that successfully terminates, and grouping the symbols according to said paths, The computer-implemented method comprising;

upon receipt of a message at a computer, performing a lexical analysis of the message; and, in dependence on lexical analysis of the message assigning the message to one of the groups identified according to said paths.

The invention provides a method by which the repeated full execution of a parser is rendered unnecessary and replaced by a more efficient process that determines the appropriate cluster identifier to associate with a message. A lexical analysis is performed on a received message and, in dependence on this, the message may be successfully allocated to an appropriate cluster. Thus, an efficient and quick method is provided by which a message may be allocated to the appropriate message cluster. As compared to the basic EGC method quicker and more efficient message allocation may be achieved since it is in on dependence on the lexical analysis that the assignment is determined.

In an embodiment, in the step of performing a lexical analysis of the message a sequence of tokens is generated corresponding to the message. It is preferred that in dependence on the sequence of tokens, a message digest is assigned to the message, the message digest corresponding to the said one of the groups.

Preferably, the tokens are tokens that are directly related to some of the tokens that would have been used in a full parse of the message. Preferably, the token sequence is a syntactic sequence, thereby enabling semantic grouping of the messages based on message syntax.

Thus, the tokens are not the full language based tokens that would normally be generated by a tokenizer. "Selective Message Digest" (SMD) of an SMD token sequence produced at the lexical analysis stage may be used to allocate new messages to clusters. Thus, a full parse of a received message is not required for every message and so the process is quicker and more efficient than the EGC method described above.

An embodiment of the invention provides a method of going directly from a lexical analysis phase to the cluster identifier without the computational complexity of a full parse of the message. In the case where the full parse has already been performed and the cluster identifier determined, then any repeat parse which would have generated such a cluster identifier can be determined solely by the SMD value generated at the lexical analysis stage. Embodiments of the invention provide a simple and robust method by which the beneficial effects of the EGC patent applications, discussed above, can be achieved in a significantly more computationally efficient and quick manner.

In embodiments, the invention provides a method whereby the repeated full execution of a parser is rendered unnecessary for previously processed message types and replaced by a much more efficient process that determines the appropriate cluster identifier to associate with a message by the "Selective Message Digest" (SMD) of the SMD token sequence produced at the lexical analysis stage.

Preferably, the token sequence is a syntactic sequence, thereby enabling semantic grouping of the messages based on message syntax. This enables a subsequent syntactic token sequence that has the same semantic grouping to be quickly identified.

Preferably, a message digest is calculated for a token sequence using a method selected from the group consisting of shift and rotate on the entire token sequence, SHA family or Message-Digest algorithm 5 (MD5) algorithms on the entire token sequence and an interleaved Message Digest method integrated into the tokenization process. Thus, commonly available and reliable algorithms may be used to generate the message digest.

In one example, not all tokens of a standard input language are used to create the message identifier. This provides the advantage that it is possible to group messages that are syntactically different into the same message cluster.

Preferably, the computer system includes a computer resource and the messages are directed to the computer resource. The method enables a determination to be made as to whether or not usage of the computer resource is changing at a semantic level.

In some cases, the messages directed to the computer system are attempts to inappropriately utilise the computer resource. In such cases, the method enables a system administrator or manager effectively to utilise detection to stop inappropriate use of the resource.

In a preferred embodiment, the computer system includes a computer resource and the messages are sequences of machine instructions that are about to run through a microprocessor within the computer system. Thus, the method can be used to detect buffer overflow exploits.

In one example, the computer resource is a relational database and messages are submitted in a language such as Structured Query Language. The method can therefore be used to detect and monitor inappropriate access and database attack techniques such as SQL injection.

Preferably, the process is performed progressively in that tokens are formed progressively as the message is received. This enables effective use of RAM to be made and enables the method to operate with messages that are non-grammatical structures.

In an embodiment, upon receipt of a message a check is made as to whether or not there already exists an identified group for messages with the token sequence of the received message and, if there is, assigning the message to the identified group. In such cases it is possible or probable that actions will have been identified for performance upon recognition of a message belonging to a particular cluster. Accordingly, the method enables the appropriate action to be identified and triggered quickly and efficiently.

In one embodiment, if it is ascertained that there is not already an existing identified group for a received message a full parse of the message is performed and a group is established for the message and for subsequent messages having the same token sequence. Thus, a full parse may be done only when it is necessary, thus increasing efficiency as unnecessary parsing may be avoided.

Preferably, the method comprises generating, e.g. automatically, statistical data in respect of the groups to which messages belong. The generation of such statistical data is useful since it can be used for applications such as accounting, charging, monitoring performance and detecting inefficiencies and the like.

According to a second aspect of the present invention, there is provided a computer program arranged such that when run on a computer it causes the computer to perform the method of the first aspect of the present invention.

According to a third aspect of the present invention, there is provided a computer programmed to carry out a method according to the first aspect of the present invention.

According to a fourth aspect of the present invention, there is provided a computer-implemented method of analyzing symbols in a computer system, the symbols conforming to a specification for the symbols, in which the specification has been codified into a set of computer-readable rules; and, the symbols analyzed using the computer-readable rules to obtains patterns of the symbols by determining the path that is taken by the symbols through the rules that successfully terminates, and grouping the symbols according to said paths, the method comprising; upon receipt of a message at a computer, performing a lexical analysis of the message to generate one or more tokens corresponding to the message; and, in dependence on the sequence of tokens assigning the message to one of the groups identified according to said paths.

From a mathematical perspective, selective message digest (SMD), in which a message digest is performed based on a sequence of tokens in which it is the form of the tokens that is considered, and EGC as described above are hierarchical abstractions between the raw message, i.e. the textual sequence of characters and to the actual semantics or meaning of the message (in the context of its operating environment).

For example, starting from the sequence of characters and moving in an order in which each step represents a generalization, the following stages might be included:

1) A {sequence of characters}
2) A {sequence of tokens}
3) A {sequence of SMD tokens}
4) A {SMD Value}
5) One or more {SMD value} maps to a {Cluster ID}

At each level of generalization in the hierarchy specific detail is lost, whilst managing to track the "essence", "intent", or "motive" of the original message. This "essence" can be recognised in another non-identical message. The computer or computer program can thus easily be trained to respond to this other non-identical message in the same way that has been specified for the previously observed message. SMD is a much finer-detail method of tracking message "essence" than that provided by EGC.

For the SMD calculation it is only necessary that the tokenization succeeds. Even if the message is not valid (with respect to the language) an SMD value will still be generated. This property is particularly useful in the case in which the EGC grammar is deficient and the message is valid but not recognised (by parsing) by the grammar and in the case in which the message is not valid and correctly determined as such, but a (buggy) system sending the invalid message continues to do so and an action needs to be taken for each of these invalid messages. One typical action might be blocking the message arriving at the resource. In the context of an SQL Database, if the database receives the message it will attempt to process the message, consuming resources needlessly, eventually failing and returning an error to the sender. Another typical action might be translating the invalid message into a valid message. Both cases require the next invalid message to be determined to be of a form that has already been observed so that the appropriate action can be taken. SMD can be utilized to do just this.

Accordingly, in a fifth aspect, the invention provides a computer-implemented method of analyzing symbols in a computer, the method comprising;

upon receipt of a message at a computer, performing a lexical analysis of the message to determine tokens for the message;

selecting a form of the tokens to generate a sequence of generalised tokens representative of the message. A computer program is also provided, the computer program being arranged such that when run on a computer it causes the computer to perform the method of the fifth aspect of the present invention.

A method is provided that provides for a simple and robust way of processing messages when tokenization has succeeded irrespective of whether or not the message is valid.

Preferably, a message digest is assigned to the sequence of generalised tokens. Thus, a simple and robust method is provided by which a selectively tokenised message can be assigned a means of identification and/or qualification.

Thus, the present method provides that even if a message is not valid (with respect to the language) an SMD value will still be generated. As mentioned above, this property is particularly useful in the case in which the EGC grammar is deficient and the message is valid but not recognised (by parsing) by the grammar and in the case in which the message is not valid and correctly determined as such, but a (buggy) system sending the invalid message continues to do so and an action needs to be taken for each of these invalid messages.

BRIEF DESCRIPTION OF THE DRAWINGS

Embodiments of the present invention will now be described by way of example with reference to the accompanying drawings, in which.

DETAILED DESCRIPTION OF THE INVENTION

Using the present method, initially a raw data stream is received at a computer from a source, e.g. a network, to which the computer is connected. A tokenizer, described in detail below, operates on the data to produce Selective Message Digest (SMD) tokens corresponding to the data stream. Once the SMD tokens have been identified, if the sequence of tokens has been seen before by the computer as determined by their SMD value, then the sequence of tokens is allocated an existing message digest. If the sequence of tokens has not been seen before by the computer then a full parse of the message is performed. Based on the assigned selective message digest the message can then be grouped or assigned to an appropriate cluster as would previously have happened in the EGC method after a full parse of the message had been performed.

Thus, the message digest may be allocated based on the sequence of tokens without a full and computationally intensive parse of the message being performed. Using the present method, there is no need to determine the execution path of the message through the program logic in order to assign to it a cluster identifier. Rather, the cluster identifier may be assigned based on the SMD token sequence and an associated selective message digest SMD value.

Figure 4:
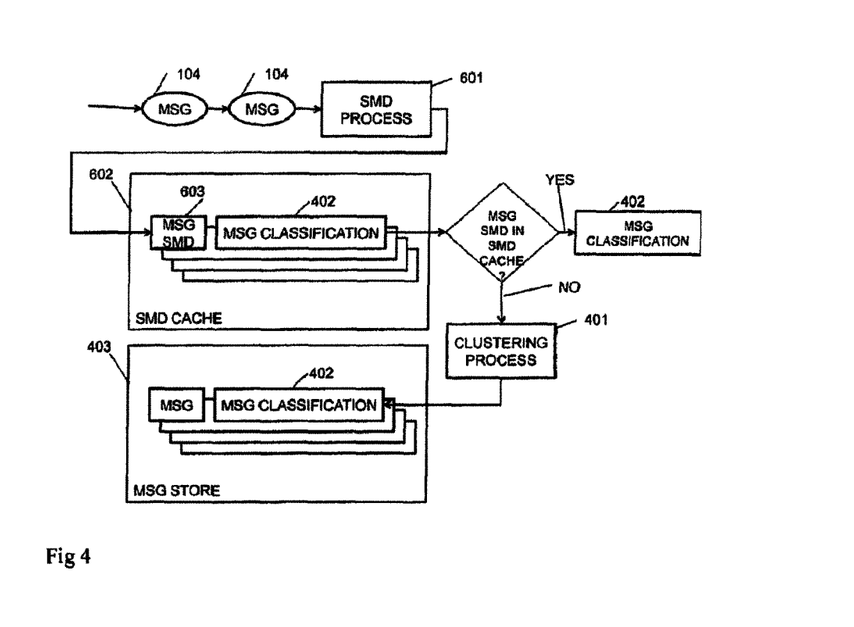
FIG. 4 shows a schematic representation of the steps and/or components in the process or system for selective message digest.

FIG. 4 shows a schematic representation of the steps and/or components in the process or system for Selective Message Digest within an EGC method. A method is provided by which the full execution of a parser is rendered unnecessary and replaced by a more efficient process that determines the appropriate cluster identifier to associate with a message. A "Selective Message Digest" (SMD) of the SMD token sequence is produced at the lexical analysis stage, i.e. at the stage at which the received character stream is split into meaningful symbols defined by a grammar. The message digest is said to be "selective" since the actual value of any token within a sequence of tokens is not significant in allocating a message digest to a message. Rather, the syntax of the token sequence is used as the basis for the determination. Properties of the tokens are selected (from none to all) and it is the tokens, with the properties selected, on which the message digest is performed. This is explained in more detail below.

The invention thus provides a method and apparatus by which a semantic cluster ID for a message in a given language can be determined without recourse to execute a full parse of the message. Thus, the benefits of the EGC methods described above are achieved with a reduction in the computational intensity.

The present method, as will now be described with reference to FIG. 4, can replace the process described above with reference to FIG. 2. Referring to FIG. 4, a sequence of messages MSG 104 is received at a computer or computer system. The computer system includes an SMD process 601 whose function is to determine the SMD values for each of the messages MSG 104. An SMD cache 602 is provided. The determined SMD value MSG SMD 603 for each message is stored in the SMD CACHE 602. If a corresponding message classification MSG CLASSIFICATION 402 is already stored in the SMD CACHE 602 then the classification for this message may be determined. If the message classification MSG CLASSIFICATION 402 is not already stored in the SMD CACHE 602 then the value MSG SMD 603 is stored and the message classification is determined using the EGC Clustering Process 401 described above. In other words a parse of the message is performed and the execution path of the message through the program logic is determined. This produces the classification of the message MSG CLASSIFICATION 402 which is stored along with a copy of the message in the message store MSG STORE 403.

As well as the message, other attributes about the message, i.e. metadata in respect of the message, can be included in the message store MSG STORE 403. For example such metadata might include, the date & time the message was received, the username or application name that sent the message, network addressing information about the source and destination of the message and so on. Each time a new message is received, the SMD CACHE 602 is updated so that it contains a record of the MSG SMD 603 and the corresponding MSG CLASSIFICATION 402 which has been determined by the CLUSTERING PROCESS 401. Thus, there are two routes by which a MSG CLASSIFICATION 402 can be determined. Either the classification is determined based on a Selective Message Digest 603, or if the message digest is not recognised then a full clustering process 401 according to the EGC method may be performed. Once a full clustering process 401 has been performed and a new cluster formed, this new cluster will be assigned its own message digest so that subsequent messages belonging to the new cluster will not have to be processed using the full EGC method but rather can be grouped based on a simple lexical analysis as described above.

Figure 5:
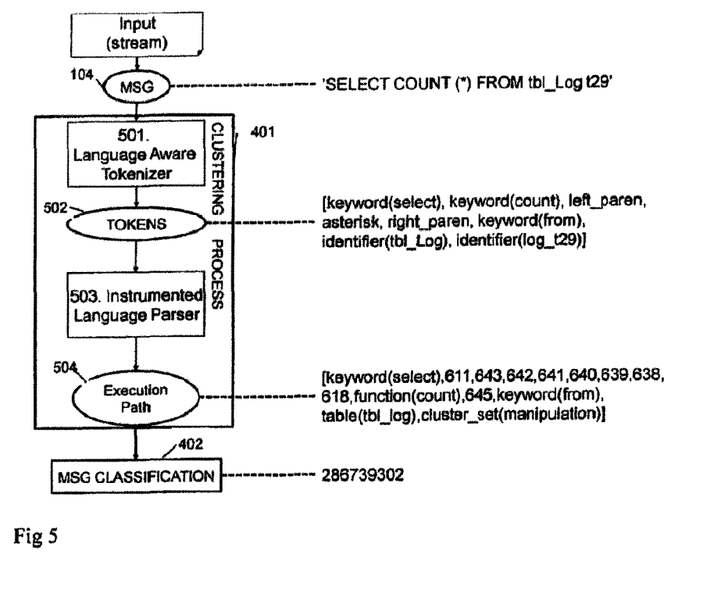
FIG. 5 shows a schematic representation of an example of steps in an Efficient Grammatical Clustering process.

FIG. 5 shows a schematic representation of an example of an embodiment of a grammatical clustering process such as might have been used in the EGC patent applications referred to above. In the example of FIG. 5, the messages are in the form of Structured Query Language (SQL) commands destined for a database resource (not shown). A message MSG 104 is extracted from the input (stream) and delivered to the CLUSTERING PROCESS 401. A Language Aware Tokenizer 501 produces TOKENS 502 from the message MSG 104. The TOKENS 502 are then parsed by an Instrumented Language Parser 503, which determines the Execution Path 504 on which the MSG CLASSIFICATION 402 can be determined. The parsing process is often a significant computer program containing logic to determine whether the sequence of tokens is grammatically correct with respect to the language. The search space of such a process is very large and can have high computational complexity.

The Instrumented Language Parser 503 is an embodiment of the EGC system in which the instrumented computer program is a parser. The instrumentation is points in the original program source code which provide records each time they are successfully executed. The information recorded varies and the different forms include:

(a) no information (some functions are not deemed sufficiently important);
(b) simply an index of the function or computer program branch that was executed; or
(c) information about what data and what processing outcomes occurred when the function was executed.

This process is analogous to setting debug "spy points" and running a computer program in debugging mode, whilst collecting the sequence of spy points that were triggered in the execution. An example of a sequence of recorded instrumentation information (analogous to the sequence of spy points) is shown in FIG. 5 and is the "path" [keyword(select), 611, 643, 642, 641, 640, 639, 638, 618, function(count), 645, keyword(from), table(tbl_log), cluster set(manipulation)]. This is to be understood as during the processing of the successful parse of the SQL message "SELECT COUNT (*) FROM tbl_Log t29" the instrumented SQL Language parser was measured first processing "keyword(select)" (a type (c) form of instrumentation), then successfully executing the sequence of parsing functions denoted by indexes 611, 643, 642, 641, 640, 639, 638, 618—each being a type (b) form of instrumentation. The next instrumented function to be recorded was "function(count)" followed by parsing function denoted by index 645, then the two records "keyword(from)" and "table(tbl_log)". The final recorded instrumentation is "cluster set(manipulation)", which provides information about the overall type of message that was parsed. Many other functions will have been executed in the successful parse of the message but as they are type (a) forms of instrumentation they are not recorded. Furthermore, there are a large number of functions within the instrumented language parser that were not used in any manner in the successful parse of the SQL message. For a more detailed description of the Efficient Grammatical Clustering process refer to our co-pending US and European patent applications entitled "A method, A Computer Program and Apparatus for Analyzing Symbols in a Computer" having application numbers U.S. Ser. No. 11/672,253 and EP-A-1,830,253, respectively.

Figure 6:
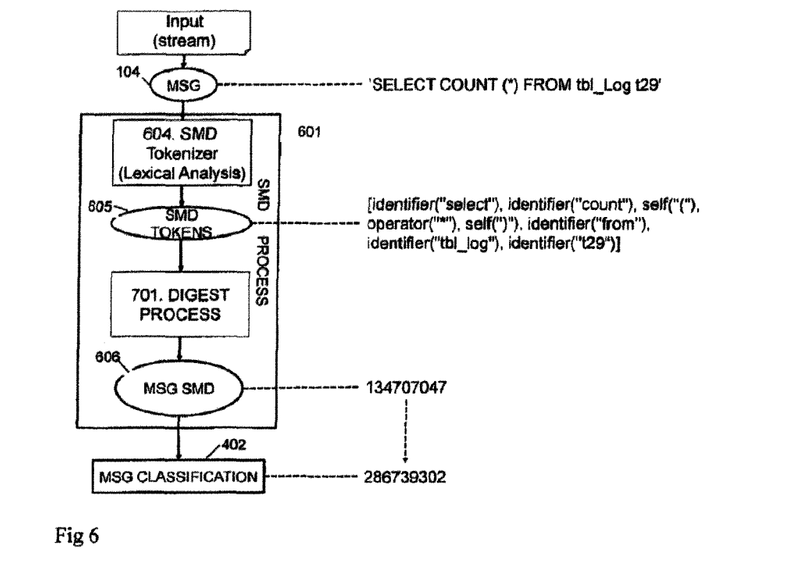
FIG. 6 shows a schematic representation of an example of steps in a Selective Message Digest process.

An example of the SMD PROCESS 601 is shown in FIG. 6. In this example, the messages are again in the form of SQL commands destined for a database resource. As in the example of FIG. 5, the message MSG 104 is extracted from the input (stream). In this case though, instead of being delivered to the language aware tokenizer and parser of FIG. 5, the message is delivered to the SMD PROCESS 601. The SMD PROCESS 601 includes an SMD Tokenizer 604 and a DIGEST PROCESS 701.

When a message is received, a lexical analysis is done by the SMD Tokenizer 604 so as to produce SMD TOKENS 605 from the message. The SMD TOKENS 605 are then sent to the DIGEST PROCESS 701 which serves to determine the message SMD (MSG SMD 606). The MSG SMD 606 is then checked against stored MSG CLASSIFICATIONs 402 determined from a prior CLUSTERING PROCESS 401. Thus, the cluster identification to which a particular message belongs, may be performed based on SMD tokens generated by lexical analysis without a full parse of the message having been performed.

In contrast to the system and method described with respect to FIG. 5, in this case, instead of an execution path (through program logic) being determined by an Instrumented Language Parser 503 leading to the MSG classification 402, this is achieved by the use of a Selective Message Digest based on the SMD tokens 605. There is therefore, in many cases no need to determine the execution path of the message through the logic of the program, for which a full parse would be necessary, but rather the cluster to which the message belongs can be determined based only on the input SMD token stream.

As in the EGC method, in an embodiment, the method is initially carried out on training examples of symbols. This allows a base set of patterns of symbols to be built up and message digests to be assigned to sets or clusters of the patterns. These can be analyzed by a human domain expert who can determine which patterns relate to acceptable or normal behavior, so that new symbols can be classified accordingly. In principle, the training examples may be examples of symbols that are known to be acceptable thereby to obtain patterns of symbols that are known to be acceptable. However, more likely in practice is that the training examples will be general and a decision will be made later, after the patterns have been produced and based on the patterns, as to which patterns are to be deemed acceptable or not.

To determine a Selective Message Digest process that maps a message SMD 606 to a message classification 402 requires that the appropriate tokens are determined for inclusion in the SMD Token sequence 605. Not all tokens of the standard input language are required to create a MSG SMD 606 that maps directly to a MSG CLASSIFICATION 402. In the present method, what is important is that appropriate token forms are utilised in the SMD Tokenization process when determining or generating an SMD Token sequence 605. Appropriate tokens are selected on which the SMD is performed that allows a direct mapping to the cluster ID produced by the EGC process described above.

Token forms that are related to the part in the instrumented parse provided by the EGC process are considered in the SMD Token sequence, which can then be subsequently used to develop the message SMD. Examples of participating token forms include identifiers, operators, some punctuation and value types (but not values themselves). For example a 'number' may be used as a token but not its value or a 'string' of characters may be used but not the actual spelling. Thus, no full parse of the statement is required as it is not relevant what the actual spelling or number is. What matters is the token form. Values within the statement can be ignored at this stage and are not needed to identify the cluster to which a message belongs. Previously, in the EGC method after the language aware tokenizer had acted to identify tokens within the message, an instrumented parser might typically have been utilised so as to fully parse the message and then allocate it to an appropriate cluster. In the present system, a Selective Message Digest is produced based on the token type and not the values themselves.

There may well be cases in which the generated SMD token sequence is not recognised and so on occasion full instrumented parse of the message will be done. However, in most cases this will not be necessary and so significant savings in terms of computing and processing time may be achieved. As compared to the basic EGC method, the present method operates significantly faster. For example, it might operate up to 10 times faster than the basic EGC method.

Figure 7:
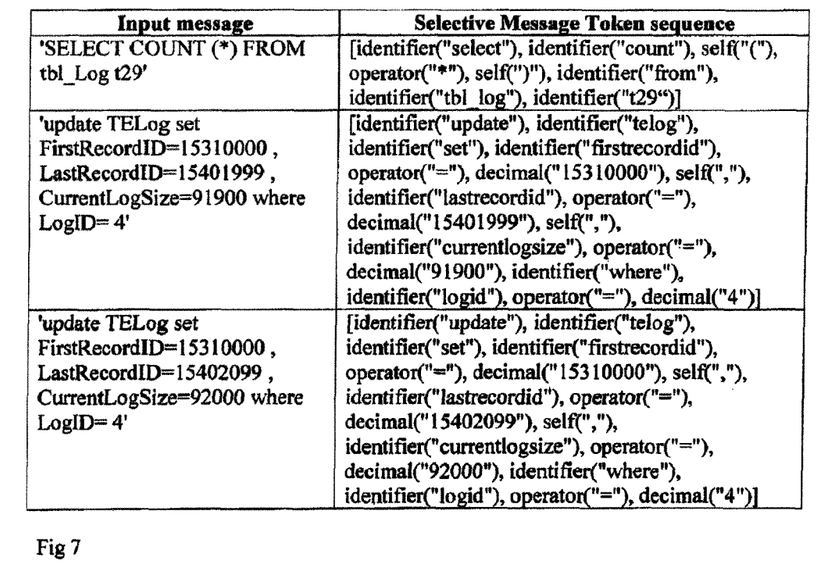
FIG. 7 shows an example of a table of Selective Message Token sequences.

The Selective Message Digest token sequence for sample SQL messages are shown in the table in FIG. 7. Taking the first example, the message 'SELECT COUNT (*) FROM tblLog t29' has been broken down in a lexical analysis to the sequence of Selective Message Digest tokens     identifier("select")
    identifier("count")
    self("(")
    operator("*")
    self(")")
    identifier("from")
    identifier("tbl Jog")
    identifier("t29").

These tokens are a coarse grouping pertaining to characters.

As compared to the parse of the message 'SELECT COUNT (*) FROM tbl_Log t29' performed in FIG. 5, the SMD tokens are at the lower semantic level with coarser discrimination to the meaning of the tokens. For example, when using the full EGC method, for the same message, the language aware tokenizer 501 generates the following sequence of tokens:

keyword (select)
    keyword (count)
    left_paren
    asterisk
    rightparen
    keyword (from)
    identifier(tbl_Log)
    identifier(log_t29).

Instead of the first token being of the general category "identifier", it is classified more specifically as a "keyword". Instead of the 3rd and 5th tokens in the sequence being of the category "self", they are specified as being the left and right parentheses.

Thus, the full EGC tokenisaton generates tokens pertaining to the properties of the meaning of the language.

The sequence of Selective Message Digest tokens provides the basis for calculating a unique value for each sequence. There are many appropriate methods for calculating such a unique value in which that an arbitrary block of data is taken and a fixed-size bit string is returned. This process is often referred to as "hashing" and the hash value in this context is often called the message digest. Any suitable means may be used. Some specific examples of the Selective Message Digest Process are Shift & Rotate methods on the entire Selective Message Digest token sequence, SHA family or Message-Digest algorithm 5 (MD5) family of hash methods on the entire Selective Message Digest token sequence and an interleaved Message Digest method integrated into the Selective Message Digest tokenization process.

Referring again to FIG. 6, and using the example of 'SELECT COUNT (*) FROM tbl_Log t29' discussed above, the sequence of tokens is provided to the Digest Process 701 and from this the MSG SMD 606 for the message is determined. The Selective Message Digest values are a way to provide unique cluster identifiers to messages that might have been identified using the EGC method referred to above. In the example shown, the sequence of tokens in this case provides a selective message digest of 134707047 which is then associated with the cluster ID (MSG Classification 402) value 286739302.

Figure 8:
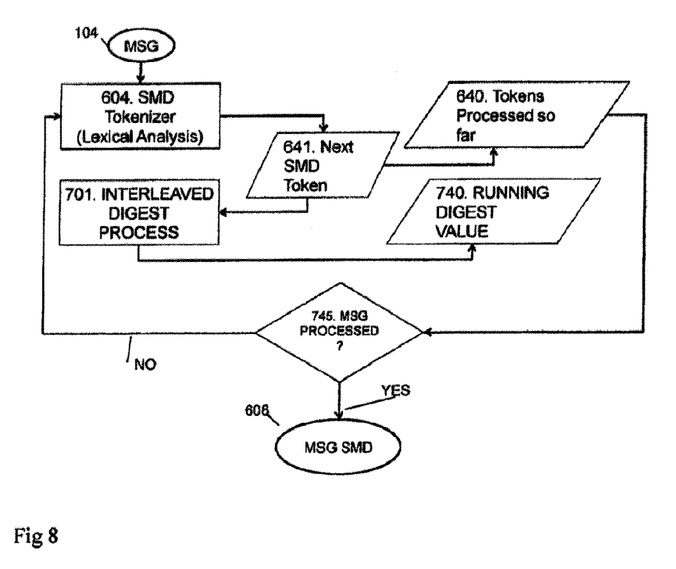
FIG. 8 shows an example of an interleaved Selective Message Digest process.

FIG. 8 shows an example of an interleaved Selective Message Digest process. With reference to FIG. 8 and with respect to the same specific message used as an example above, i.e. the SQL message 'SELECT COUNT (*) FROM tbl_Log t29', the process by which an interleaved Message Digest may be integrated into the Selective Message Digest described above, is explained as follows.

First, message MSG 104 ['SELECT COUNT (*) FROM tbl_Log t29'] is progressively tokenised by the SMD Tokenizer 604. The SMD Tokenizer 604 performs lexical analysis of the message to generate the tokens within the message. As the first data forming the message is received, the initial sequence of Tokens Processed so far 640 is empty. The progressive nature of the tokenization means that the analysis of the message processes one token at a time, each time producing a Next SMD Token 641

The Interleaved Digest Process 701 uses the Next SMD Token 641 and combines this with a Running Digest Value 740 to produce an updated Running Digest Value 740.

Initially the Running Digest Value 740 is set to null. A test, labeled in the figure as MSG PROCESSED 745, is performed to determine whether the entire message MSG 104 has been processed. If the entire message has been processed (the Yes branch) then the MSG SMD 606 value is set to the Running Digest Value 740. If the entire message has not yet been processed (the No branch), then flow of control returns to the SMD Tokenizer 604 to produce the next token in the message sequence. After two iterations of this flowchart for the case of the message MSG 104 'SELECT COUNT (*) FROM tbl_Log t29' the data stores contain the following values:

| Data Store | Value |
| --- | --- |
| 640 Tokens Processed so far | identifier(" select"), identifier(" count") |
| 641 Next SMD Token | self("(") |
| 740 Running Digest Value | 0xf3db7465 |

Thus, there are two tokens in the "tokens processed so far" category, which are the identifiers ("select") and ("count"). The next SMD token as stored in block 641 in FIG. 8 is self("("). After digesting the next SMD Token self("(") the Running Digest Value 740 becomes 0x27bf8cd5. The final MSG SMD 606 value for the message 104 MSG 'SELECT COUNT (*) FROM tbl_Log t29' is 0x8077767. Using an interleaved process such as that described with reference to FIG. 8 makes efficient use of RAM.

It will be understood that the methods described herein will typically be carried out by appropriate software running on appropriate computer equipment. The term "computer" is to be construed broadly. The term "a computer" or similar may include several distributed discrete computing devices or components thereof. The computer program may be in the form of source code, object code, a code intermediate source and object code such as in partially compiled form, or in any other form suitable for use in the implementation of the processes according to the invention. The carrier can be any entity or device capable of carrying the program. For example, the carrier may comprise a storage medium, such as a ROM, for example a CD ROM or a semiconductor ROM, or a magnetic recording medium, for example a floppy disk or hard disk. Further, the carrier may be a transmissible carrier such as an electrical or optical signal, which may be conveyed via electrical or optical cable or by radio or other means.

The methods described herein have application wherever it is useful to be able to analyze symbols passing through or stored in a computer system. This can include cases where third parties attempt to utilise a computer inappropriately, e.g. to take control of a computer by "attacking" the computer system, and other cases too. For example, the same approach may be used within a running computer system and is not restricted to externally transmitted messages. The messages can be, for example, sequences of machine instructions that are about to run through the microprocessor. Thus, the method has application wherever it is generally desired or required to know if a system is operating appropriately.

Embodiments of the present invention have been described with particular reference to the examples illustrated. However, it will be appreciated that variations and modifications may be made to the examples described within the scope of the present invention. For example different languages, different instrumented computer programs, differing message formats, different input/output formats to computer programs may all be used as appropriate.

What is claimed is:

1. A method of analyzing messages in a computer system comprising:
   receiving a message including symbols at a computer, including a computer readable storage medium and processor, in the computer system;
   performing, by the computer, a lexical analysis of the message, the lexical analysis generating a sequence of tokens based on the symbols included in the message, wherein a token in the sequence of tokens corresponds to a category of symbols, and wherein the category of symbols corresponds to a plurality of symbols having different values;
   determining a message digest for the sequence of tokens, wherein the message digest is updated as each token in the sequence of tokens is identified during the lexical analysis;
   assigning the message to a cluster group based on the message digest.

2. The method of claim 1, further comprising
   determining that the message digest is associated with a cluster identifier;
      assigning the message to the cluster group based on the associated cluster identifier; and
      determining not to fully parse the message.

3. The method of claim 1, further comprising:
   determining that the message digest is not associated with a cluster identifier;
   fully parsing the message to determine a cluster identifier to associate with the message; and
   associating the message digest with the cluster identifier.

4. The method of claim 3, further comprising:
   determining that the cluster identifier is not associated with a cluster group;
   establishing a first cluster group associated with the cluster identifier;
   assigning the message to the first cluster group;
   after assigning the message to the first cluster group, receiving a new message;
   determining a second message digest for the new message;
   determining that the message digest is the same as the second message digest; and
   assigning the new message to the first cluster group.

5. The method of claim 4, wherein at least one token of the sequence of tokens is not used to create the message digest.

6. The method of claim 1, wherein the symbols in the message conform to a specification for the symbols, wherein the specification has been codified into a set of computer-readable rules; and
   further comprising parsing the message based on the set of computer readable rules.

7. The method of claim 1, in which the message digest is calculated for the tokens in the sequence of tokens using one of:
   shift and rotate performed on an entire token sequence, wherein the entire token sequence comprises all tokens in the sequence of tokens;
   an algorithm from the SHA family of algorithms performed on the entire token sequence;
   an algorithm from the Message-Digest algorithm 5 (MD5) algorithms performed on the entire token sequence; or
   an interleaved Message Digest method integrated into a tokenization process.

8. The method of claim 1, wherein the computer system includes a computer resource, and a particular message directed to the computer system comprises machine instructions that attempt to gain access to the computer resource.

9. The method of claim 8, wherein the computer resource is a relational database and the message comprises Structured Query Language.

10. The method of claim 1, further comprising forming tokens progressively as the message is received.

11. The method of claim 1, further comprising automatically generating statistical data corresponding to cluster groups to which messages are assigned.

12. A non-transitory computer-readable storage medium comprising a plurality of computer-readable instructions tangibly embodied on the computer-readable storage medium, which, when executed by a data processor, provide for analyzing symbols in a computer system, the plurality of instructions comprising:
   instructions that cause the data processor to to receive a message including symbols;
   instructions that cause the data processor to perform a lexical analysis of the message, the lexical analysis generating a sequence of tokens based on the symbols included in the message, wherein a token in the sequence of tokens corresponds to a category of symbols, and wherein the category of symbols corresponds to a plurality of symbols having different values;
   instructions that cause the data processor to determine a message digest for the sequence of tokens, wherein the message digest is updated as each token in the sequence of tokens is identified during the lexical analysis;

instructions that cause the data processor to assign the message to a cluster group based on the message digest.

13. The non-transitory computer-readable storage medium of claim 12, the instructions further comprising:
   instructions that cause the data processor to determine that the message digest is associated with a cluster identifier;
   instructions that cause the data processor to assign the message to the cluster group based on the associated cluster identifier; and
   instructions that cause the data processor to determine not to fully parse the message.

14. The non-transitory computer-readable storage medium of claim 12, the instructions further comprising:
   instructions that cause the data processor to determine that the message digest is not associated with a cluster identifier;
   instructions that cause the data processor to fully parse the message to determine a cluster identifier to associate with the message; and
   instructions that cause the data processor to associate the message digest with the cluster identifier.

15. The non-transitory computer-readable storage medium of claim 14, further comprising:
   instructions that cause the data processor to determine that the cluster identifier is not associated with a cluster group;
   instructions that cause the data processor to establish a first cluster group associated with the cluster identifier;
   instructions that cause the data processor to assign the message to the first cluster group;
   instructions that cause the data processor to, after assigning the message to the first cluster group, receive a new message;
   instructions that cause the data processor to determine a second message digest for the new message;
   instructions that cause the data processor to determine that the message digest is the same as the second message digest; and
   instructions that cause the data processor to assign the new message to the first cluster group.

16. The non-transitory computer-readable storage medium of claim 15, wherein at least one token of the sequence of tokens is not used to create the message digest.

17. The non-transitory computer-readable storage medium of claim 12, wherein the symbols in the message conform to a specification for the symbols, wherein the specification has been codified into a set of computer-readable rules; and
   further comprising instructions that cause the data processor to parse the message based on the set of computer readable rules.

18. The non-transitory computer-readable storage medium of claim 12, wherein the message digest is calculated for tokens of the sequence of tokens using one of:
   shift and rotate performed on an entire token sequence, wherein the entire token sequence comprises all tokens in the sequence of tokens;
   an algorithm from the SHA family of algorithms performed on the entire token sequence;
   an algorithm from the Message-Digest algorithm 5 (MD5) algorithms performed on the entire token sequence; or
   an interleaved Message Digest method integrated into a tokenization process.

19. The non-transitory computer-readable storage medium of claim 12, wherein the computer system includes a computer resource, and a particular message directed to the computer system comprises machine instructions that attempt to gain access to the computer resource.

20. The non-transitory computer-readable storage medium of claim 19, wherein the computer resource is a relational database and the message comprises Structured Query Language.

21. The non-transitory computer-readable storage medium of claim 12, the instructions further comprising:
   instructions that cause the data processor to form tokens progressively as the message is received.

22. The non-transitory computer-readable storage medium of claim 12, wherein a message comprises a sequence of one or more machine instructions that are executed by a microprocessor within the computer system.

23. The non-transitory computer-readable storage medium of claim 12, the instructions further comprising instructions that cause the data processor to automatically generate statistical data corresponding to cluster groups to which messages are assigned.

* * * * *

UNITED STATES PATENT AND TRADEMARK OFFICE
CERTIFICATE OF CORRECTION

| | | |
|---|---|---|
| PATENT NO. | : 8,909,566 B2 | Page 1 of 1 |
| APPLICATION NO. | : 13/377803 | |
| DATED | : December 9, 2014 | |
| INVENTOR(S) | : Moyle et al. | |

It is certified that error appears in the above-identified patent and that said Letters Patent is hereby corrected as shown below:

In the Specification:

In column 4, line 32, after "in" delete "on".

In column 11, line 25, delete "tblLog" and insert -- tbl_Log --, therefor.

In column 11, line 62, delete "tokenisaton" and insert -- tokenization --, therefor.

In column 12, line 38, delete "641" and insert -- 641. --, therefor.

In column 12, line 49, delete "SMD" and insert -- SMD. --, therefor.

In the Claims:

In column 14, line 55, in Claim 12, after "processor to" delete "to".

Signed and Sealed this
Fourth Day of August, 2015

Michelle K. Lee
*Director of the United States Patent and Trademark Office*